(12) United States Patent
Lathrop et al.

(10) Patent No.: US 9,902,265 B2
(45) Date of Patent: Feb. 27, 2018

(54) DISPLAY DEVICE FOR A VEHICLE, AND VEHICLE

(75) Inventors: William Brian Lathrop, San Jose, CA (US); Maria Mejia, Palo Alto, CA (US); Erik Glaser, San Francisco, CA (US); Nathaniel Coser, Palo Alto, CA (US); Helen Lu, Palo Alto, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 2 days.

(21) Appl. No.: 13/471,409

(22) Filed: May 14, 2012

(65) Prior Publication Data
US 2012/0287663 A1  Nov. 15, 2012

Related U.S. Application Data

(60) Provisional application No. 61/486,127, filed on May 13, 2011.

(51) Int. Cl.
*B64D 47/06* (2006.01)
*B60K 35/00* (2006.01)
*B60K 37/06* (2006.01)

(52) U.S. Cl.
CPC .............. *B60K 35/00* (2013.01); *B60K 37/06* (2013.01); *B60K 2350/102* (2013.01); *B60K 2350/2004* (2013.01)

(58) Field of Classification Search
CPC .............. B60K 37/06; B60K 2350/102; B60K 2350/2004; B60K 35/00
USPC ... 362/559, 558, 561, 488, 489, 23.09, 23.1, 362/23.13, 23.16, 23.17, 23.2, 23.22, 85, 362/464
See application file for complete search history.

(56) References Cited

U.S. PATENT DOCUMENTS

| 4,434,932 | A | | 3/1984 | Hara et al. |
| 4,832,427 | A | * | 5/1989 | Nanba et al. ................... 359/15 |
| 5,644,289 | A | | 7/1997 | Frehner et al. |
| 6,152,066 | A | | 11/2000 | Knoll et al. |
| 6,205,275 | B1 | * | 3/2001 | Melville .................. G02B 6/06 362/554 |
| 6,542,146 | B1 | | 4/2003 | Toffolo et al. |
| 6,667,446 | B1 | * | 12/2003 | Schuberth .............. G05G 1/105 200/4 |
| 7,025,482 | B2 | | 4/2006 | Yamashita et al. |
| 7,056,203 | B2 | | 6/2006 | Shibata et al. |
| 7,125,132 | B2 | | 10/2006 | Wang |
| 7,190,390 | B2 | | 3/2007 | Hett et al. |
| 7,198,393 | B2 | * | 4/2007 | Tubidis et al. ................ 362/489 |
| 7,232,245 | B2 | * | 6/2007 | Suzuki et al. ................ 362/488 |
| 7,273,278 | B2 | * | 9/2007 | Fronzek ................ B60K 35/00 345/9 |
| 7,357,095 | B1 | | 4/2008 | Fong et al. |
| 7,357,096 | B2 | | 4/2008 | Tane |
| 7,525,446 | B2 | | 4/2009 | Shibata |
| 7,534,000 | B1 | | 5/2009 | Adachi et al. |

(Continued)

FOREIGN PATENT DOCUMENTS

| CN | 101535087 A | 9/2009 |
| DE | 100 26 136 A1 | 11/2000 |

(Continued)

*Primary Examiner* — Peggy Neils
*Assistant Examiner* — William N Harris
(74) *Attorney, Agent, or Firm* — Andrews Kurth Kenyon LLP

(57) ABSTRACT

A display device for a vehicle includes a display unit, a display layer, and a light guide.

19 Claims, 6 Drawing Sheets

(56) References Cited

U.S. PATENT DOCUMENTS

| | | |
|---|---|---|
| 7,592,972 B2 | 9/2009 | Eckardt et al. |
| 7,661,859 B2 * | 2/2010 | Nakagawa ................... 362/489 |
| 7,671,851 B1 * | 3/2010 | Pryor ..................... B60K 35/00 |
| | | 345/173 |
| 7,671,859 B2 | 3/2010 | Birman et al. |
| 8,016,441 B2 | 9/2011 | Birman et al. |
| 2001/0045278 A1 | 11/2001 | Iwamoto et al. |
| 2002/0041491 A1 | 4/2002 | Nakagawa et al. |
| 2004/0129197 A1 | 7/2004 | Nakagawa et al. |
| 2005/0212721 A1 | 9/2005 | Kuwahara et al. |
| 2006/0018109 A1 | 1/2006 | Kageyama et al. |
| 2006/0044778 A1 | 3/2006 | Muramatsu |
| 2006/0066250 A1 | 3/2006 | Wang |
| 2006/0077068 A1 | 4/2006 | Harada et al. |
| 2006/0126320 A1 | 6/2006 | Fong et al. |
| 2008/0002388 A1 | 1/2008 | Sullivan |
| 2008/0123322 A1 | 5/2008 | Tane et al. |
| 2008/0135206 A1 * | 6/2008 | Alves et al. ................. 165/42 |
| 2008/0144174 A1 | 6/2008 | Lucente et al. |
| 2008/0278803 A1 | 11/2008 | Kraus |
| 2009/0015736 A1 | 1/2009 | Weller et al. |
| 2009/0078190 A1 | 3/2009 | Fournier |
| 2009/0091513 A1 | 4/2009 | Kuhn |
| 2009/0219734 A1 | 9/2009 | Sawada et al. |
| 2010/0059348 A1 | 3/2010 | Hauf |
| 2011/0025488 A1 * | 2/2011 | Leon ..................... B60K 37/06 |
| | | 340/456 |
| 2012/0057342 A1 | 3/2012 | Shih |
| 2013/0179811 A1 * | 7/2013 | Nagara ................. G06F 3/0304 |
| | | 715/765 |

FOREIGN PATENT DOCUMENTS

| | | |
|---|---|---|
| DE | 601 03 156 T2 | 5/2005 |
| DE | 10 2004 041 119 A1 | 3/2006 |
| DE | 10 2005 043 205 A1 | 3/2007 |
| DE | 10 2005 043 310 B4 | 10/2007 |
| DE | 10 2007 005 362 | 2/2008 |
| DE | 10 2007 056 450 | 10/2008 |
| DE | 10 2008 017 051 | 10/2009 |
| DE | 10 2008 032 061 A1 | 1/2010 |
| EP | 0 583 392 B1 | 3/1998 |
| EP | 1 655 750 | 5/2006 |
| EP | 1 573 374 B1 | 2/2007 |
| EP | 1 888 9741 | 2/2008 |
| JP | 2008-191274 A | 8/2008 |
| WO | 2006/024748 | 3/2006 |
| WO | 2007/053710 A2 | 5/2007 |
| WO | 2010/045411 A1 | 4/2010 |

* cited by examiner

DISPLAY DEVICE FOR A VEHICLE, AND VEHICLE

CROSS-REFERENCE TO RELATED APPLICATIONS

The present application claims the benefit of U.S. Provisional Patent Application Ser. No. 61/486,127, filed on May 13, 2011, which is expressly incorporated herein in its entirety by reference thereto.

FIELD OF THE INVENTION

The present invention relates to a display device for a vehicle and to a corresponding vehicle.

BACKGROUND INFORMATION

Digital displays are gaining an ever-increasing presence in cockpits of vehicles, for example, cockpits of cars. They are used in infotainment and navigation systems, instrument clusters, and climate controls. The use of digital displays for automotive applications will continue to increase, as cost pressures from the consumer device market cause display prices to decrease. Furthermore, the flexibility that displays provide as an application's interface in the vehicle will become an important consideration in building vehicle cockpits. One of the primary shortcomings of digital display technology is the fact that digital displays are generally rectangular in shape as well as have very flat homogeneous surfaces. This does not provide much of an opportunity for an automotive designer to differentiate the physical form factor of their display application from other competitor designs. Furthermore, these form factor restrictions may decrease readability and usability of the display.

PCT International Published Patent Application No. WO 2006/024748 describes an instrument panel including two front faces and a method of forming a front face for the instrumental panel. The instrument panel includes at least one pointer indicator including a dial of indicator characters which are supported by a front face, an indicator pointer, and a motor for rotating the pointer around the dial. The instrument panel includes a second front face. The indicator pointer is disposed between the two front faces. The front faces are flat-screen printed and subsequently formed in a relief.

German Published Patent Application No. 10 2007 056 450 describes an interface device for a climate control system of a vehicle. On a display, digital outputs of an operation of the climate control system are displayed. For maximizing an illumination of the display a three-dimensional support structure is provided enclosing three LEDs and providing that the display is arranged apart from the support structure. This increases an efficiency of the illumination.

Furthermore, German Published Patent Application No. 10 2007 005 362 describes an operating element including a push-button with a circumferential light. When operating the push-button, a tactile feedback is generated and the light is illuminated for a short time. An operating surface of the push-button may include an illuminated symbol or label.

SUMMARY

Example embodiments of the present invention provide for improved display devices.

According to example embodiments of the present invention, a display device for a vehicle is provided. The display device includes a display unit configured to emit image information to be output to a user of the display device, a display layer, and a light guide. The display layer includes a back surface and a front surface. The display layer is arranged and configured to receive the image information emitted from the display unit at the back surface and to display the image information on the front surface. The light guide includes a first surface and a second surface. The light guide is configured to guide light received at the first surface to the second surface. The light guide is mounted with its first surface at the front surface of the display layer.

Image information, which may include textural or symbol information, may be displayed on the display layer and, by use of the light guide coupled to the display layer, image information may be guided from the first surface to the second surface of the light guide, thus creating a three-dimensional impression of the display surface and the light distribution.

The display unit may include a projection display unit configured to project the image information on the back surface of the display layer or the first surface of the light guide. For example, the projection display may include a laser projection display or a liquid crystal projection display (LCD). The projection display unit provides for a large variety of form factors for the display layer. For example, the display layer may have any circumferential shape and may have a curved surface. An optical lens, for example, a Fresnel lens, may be provided between the display unit and the display layer for adjusting light beams from the display unit. Furthermore, a diffusion layer may be arranged on the back surface of the display layer acting as a display surface that is in principle similar to protection based television screens or projection based imaging systems. Furthermore, an anti-glare covering may be provided on the front surface of the display layer to increase clarity of the display in critical illumination situations and furthermore a bezel may be provided on the front surface of the display layer serving, for example, to support the display layer and to emphasize the three-dimensional impression of the display device.

The light guide may have a cylindrical shape, wherein the first and second surfaces are the end faces of the cylindrical shape. The light guide may include a light pipe and may be based on optical fibers such as glass fibers, silica fibers, plastic fibers, etc. For example, the light guide may include a plurality of optical fibers fused together. The light guide may furthermore be made of transparent plastics. As the light guide guides the light received at the first surface from the display unit to the second surface of the light guide, image information from the display unit is visible on the second surface of the light guide. This may enhance the three-dimensional impression of the display device.

The display device may furthermore include a control knob mounted on the front surface of the display layer. Within the control knob a light guide as described above may be arranged such that the first surface of the light guide is facing the front surface of the display layer and thus receiving light beams from the display layer and the second surface being exposed at a surface of the control knob, such that image information from the display unit may be displayed and visible to the user on the second surface of the light guide. The control knob may be a rotary encoder control knob configured to generate a signal in response to a rotation of the control knob. Thus, the display device may provide additionally operation elements with a variable labeling.

The above summary is merely provided to give an overview over some features of some example embodiments of the present invention and is not to be taken in a limiting sense. In particular, other example embodiments may include different features than the ones mentioned above. Furthermore, features of the above-mentioned example embodiments may be combined with each other, unless specifically noted otherwise.

DETAILED DESCRIPTION

Figure 1:
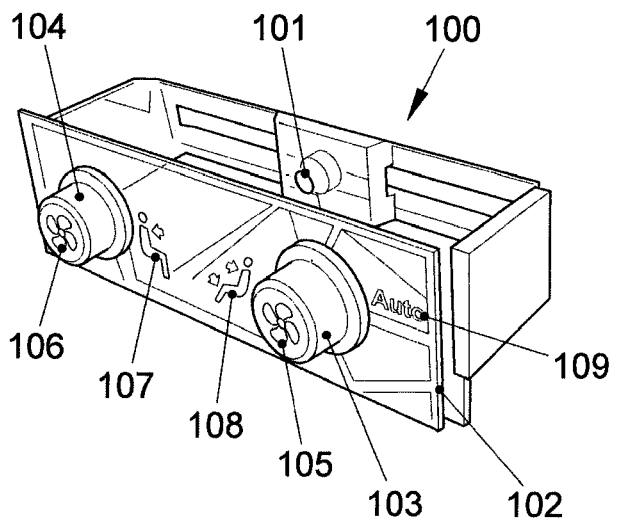
FIG. 1 schematically illustrates a display device according to an example embodiment of the present invention having a flat surface.

In the following, exemplary embodiments of the present invention will be described in more detail with reference to the accompanying Figures. It is to be understood that the following description is given only for the purpose of illustrating the principles hereof and is not to be taken in a limiting sense.

It is to be understood that the features of the various example embodiments described herein may be combined with each other, unless specifically noted otherwise. However, describing an example embodiment with a plurality of features herein is not to be construed as indicating that all those features are necessary, as other example embodiments may include less features and/or alternative features.

It is further to be understood that in the following description of example embodiments any direct connection or coupling between devices, components or other physical units shown in the drawings or described herein could also be implemented in an indirect connection or coupling. Same reference signs in the various instances of the drawings refer to similar or identical components.

Example embodiments described hereinafter may include a display unit and a light guide. In the present context, a display unit may include an electronic display or an electronic projection display and is a device which shows visible features, in particular, visible information such as text, graphics, indicators, etc., in response to electric signals. A display unit usable in the present context may include organic light emitting diode displays (OLED), liquid crystal displays (LCD), thin-film transistors displays (TFT), projection displays based on OLED, LCD, or TFT, or laser projection displays, to name just a few.

A light guide is in general a device which guides light from a first location, e.g., a first surface of the light guide, to a second location, e.g., a second surface of the light guide. A light guide may include a transparent plastic material or optical fibers.

FIG. 1 shows a display device 100 including a projection display unit 101 and a display layer 102. The display layer 102 includes a back surface facing the projection display 101 and a front surface facing a user of the display device 100. On the front surface, control knobs 103 and 104 are arranged. Each of the control knobs 103, 104 includes a light guide inside the control knob guiding light from the front surface of the display layer 102 to a surface of the control knob 103, 104, such that light from the projection display 101 is guided through the display layer 102 and the light guide inside the control knobs 103, 104 to a surface of the control knob. Thus, image information 105 and 106 may be displayed on the surface of the control knobs 103 and 104. On the remaining parts of the display layer 102, further image information form the projection display 101 may be displayed as indicated by reference numerals 107 to 109 in FIG. 1. The control knobs 103, 104 may be rotary encoder control knobs which may be rotated around their longitudinal axis by a user and which may be configured to generate a signal in response to a rotation of the control knob. The display layer 102 may include a touch-sensitive surface adapted to generate electrical signals indicating a position where a user touches the front surface of the display layer 102. Therefore, the display unit 100 may not only be used for displaying information to a user, but also for receiving control information from the user. Therefore, the display device 100 may also be referred to as a display interface or user interface.

Figure 2:
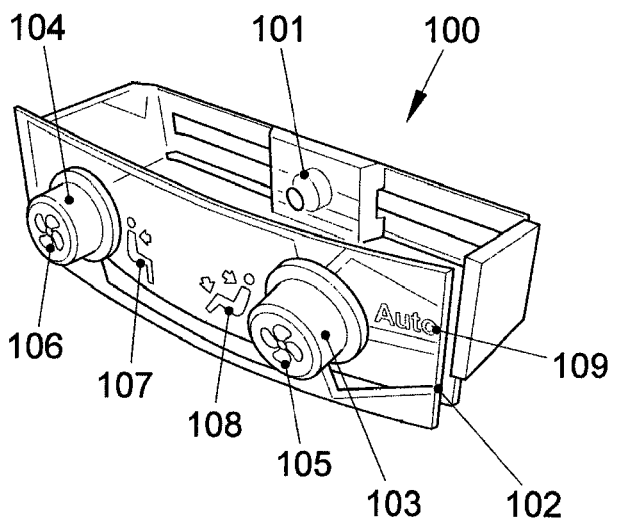
FIG. 2 schematically illustrates a display device according to an example embodiment having a curved surface.

Due to the projection based display unit 101 the display layer 102 may have any shape as desired, for example, to fit to an interior of a vehicle. For example, an outer circumference of the display layer may have not only a rectangular shape, as shown in FIG. 1, but may have any circumferential shape as desired. Furthermore, as shown in FIG. 2, the display layer 102 may be curved in one or two dimensions or may have a relief structure.

Figure 3:
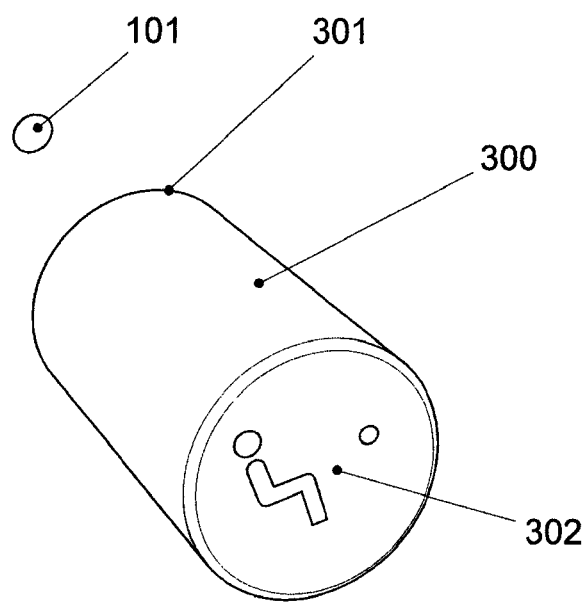
FIG. 3 shows a light guide illuminated by a display unit according to an example embodiment of the present invention.
Figure 4:
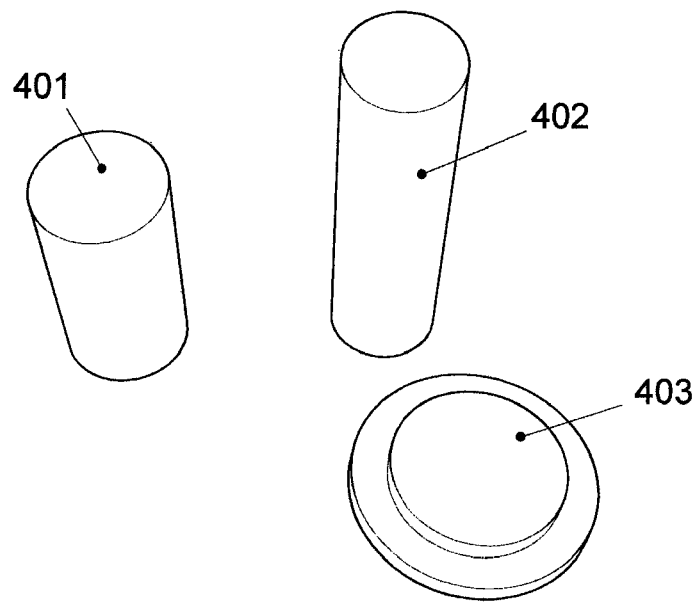
FIG. 4 shows examples of light guides for a display device according to an example embodiment of the present invention.

FIG. 3 shows how a light guide 300 operates. The light guide 300 may include fiber optic light pipes. The fiber optic light pipes can take on variable form factors via cutting and milling, as shown by examples 401-403 in FIG. 4. Light pipe 401 may have a length of 2.5 inch and 1.5 inch in diameter. Light pipe 402 may be 4 inches long and 1 inch in diameter. Furthermore, the light pipe may be a single piece of fiber optic stock that has been milled to have two plane surfaces as shown by reference sign 403. As shown in connection with FIGS. 1 and 2 the light pipes 401-403 may be integrated into a control knob and thus connected to the display layer 102 via the control knob 103, 104, or the light pipes 401-403 may be directly coupled to the display layer 102. As shown in FIG. 3, the light guide 300 has a first surface 301 and a second surface 302. The light guide 300 is configured to guide light received at the first surface 301 to the second surface 302. The first surface 301 is facing the projection display 101. An image information emitted from the projection display 101 is received at the first surface 301, guided through the light guide 300 and displayed on the second surface 302 as shown in FIG. 3. When such a light guide is mounted on a flat or curved display layer 102, a true three-dimensional display interface is obtained.

Figure 5:
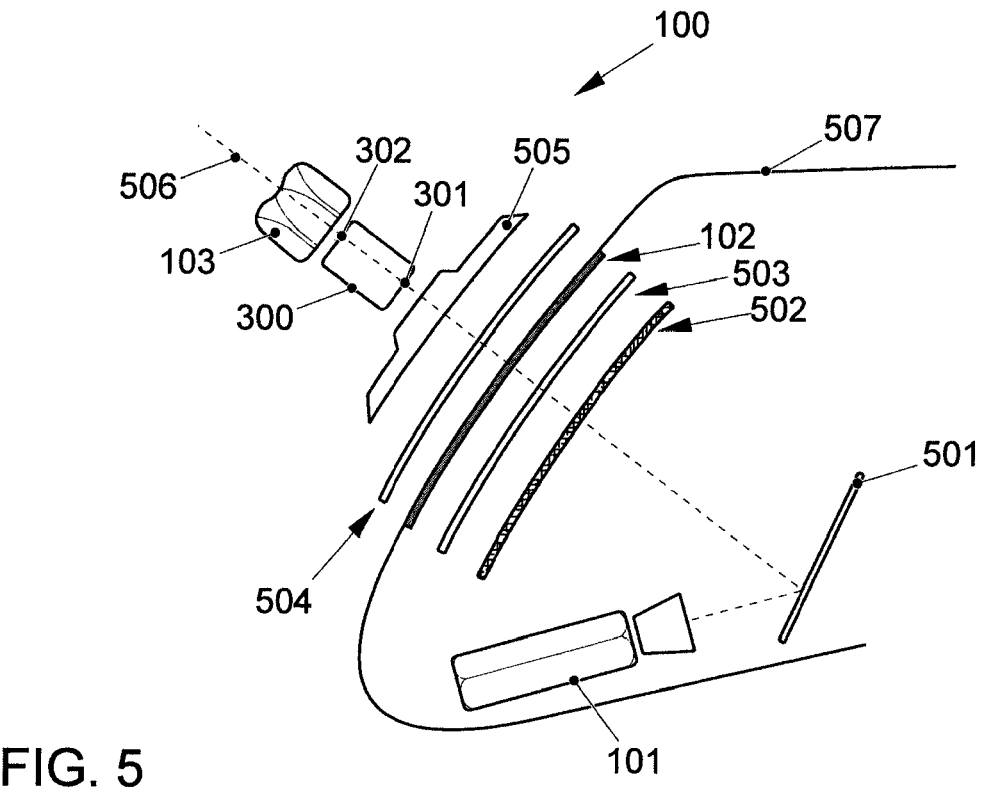
FIG. 5 schematically shows a structure of a display device according to an example embodiment of the present invention.

FIG. 5 shows the display device 100 in more detail. The display device 100 includes the projection display 101, the curved display layer 102 and the control knob 103 including the light guide 300. Furthermore, the display device 100 includes a mirror 501, a Fresnel lens 502, a diffusion layer 503, an anti-glare cover 504, and a bezel 505. The projection display 101 may be LCD-based, laser based or any other light emitting device capable of rendering and projecting an image onto a surface. Depending on the arrangement of the projection display 100, the mirror 501 may be needed to guide light beams 506 from the projection display 101 to the display layer 102. From the mirror 501 the light beams 506 are guided through the Fresnel lens 502. The Fresnel lens 502 includes many smaller lenses (prisms) used to manipulate/control the refraction of light onto the diffusion layer 503. The diffusion layer 503 acts as the display surface that is in principle similar to projection based television screens or projection based imaging systems. The diffusion layer 503 may be combined with the display layer 102 providing a curved display surface. On top of the curved display surface the optional anti-glare cover 504 is arranged. Above the anti-glare cover 504 or directly on the display surface of the display layer 102 the bezel 505 is arranged. The bezel serves as the primary support structure for components fixed to the display layer 102, for example, the rotary encoder knob 103, light guide 300 or any other types of hardware. The light guide 300 may fit through a cavity that has the same shape and dimensions as the first surface 301 of the fiber optic light pipe 300. The cavity may extend through the bezel, anti-glare covering, diffusion layer and Fresnel lens, such that the first surface 301 is exposed to the direct illumination from the projection display 101. Further, the first surface 301 of the light pipe 300 may be seated in the display device 100, such that it is flush with the diffusion layer 503. Thus, it may be achieved, that the first surface 301 of the light guide 300 and the backside of the diffusion layer 503 are at the same distance from the projection display 101. The display device 100 may be mounted in a surface 507 of a dashboard of a vehicle.

Figure 6:
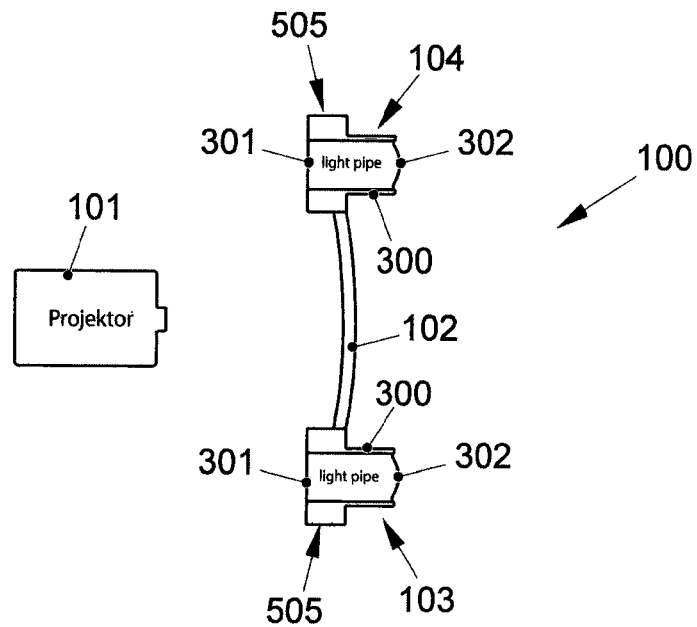
FIGS. 6 to 8 schematically illustrate display devices according to example embodiments of the present invention.

FIG. 6 shows a cross-sectional view of a display device 100 including the projection display 101, the display layer 102, control knobs 103, 104 including light guides 300, and a bezel 505. The control knobs 103, 104 may include ring encoders for generating an electrical signal in response to a rotation of the control knobs 103, 104. The bezel 505 supports the control knobs 103, 104 and the display surface 102. The first surfaces 301 of the light guides 300 are, in general, perpendicular to a longitudinal direction of the light guides 300. Furthermore, the longitudinal axes of the light guides 300 are, in general, arranged in parallel and additionally in parallel to a projection axis of the projection display 101. The second surfaces 302 of the light guides 300 have a similar curvature to that of the forward facing projection surface of the display layer 102.

Figure 7:
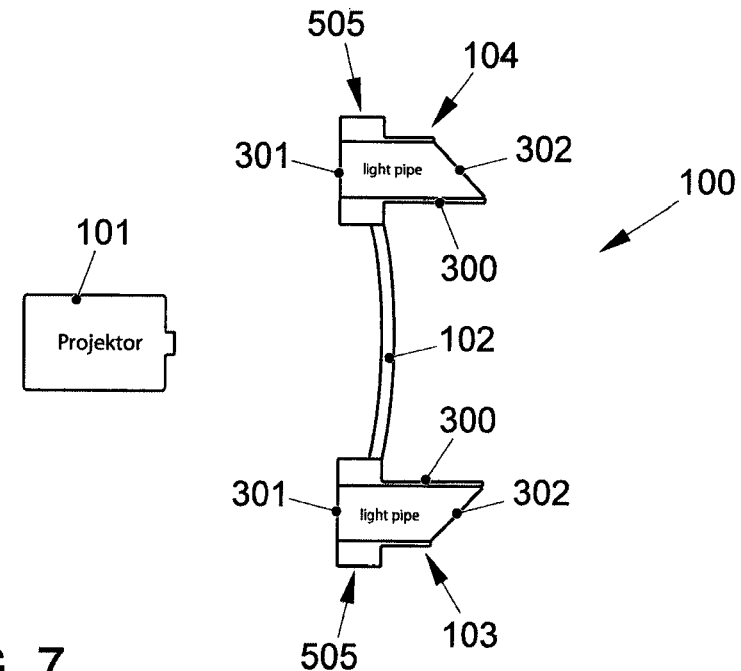

FIG. 7 shows another cross-sectional view of another example embodiment of the display device 100. Compared to the example embodiment shown in FIG. 6, the second surfaces 302 of the light guides 300 of FIG. 7 are slanted so that an image on the second surfaces 302 is shown in the direction towards a passenger or driver exclusively by each of the light guides 300.

Figure 8:
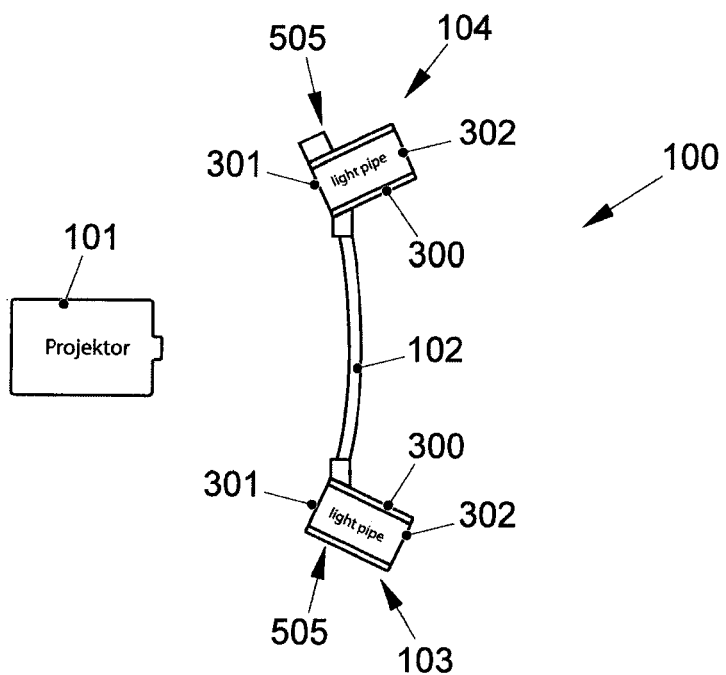

FIG. 8 shows a cross-sectional view of a further example embodiment of the display device 100. Compared to the example embodiment shown in FIG. 6, the longitudinal axis of the light guides 300 are pointing in FIG. 8 in the direction of the passenger or driver exclusively with the first surfaces 301 of the light guides 300 falling on the same arch as the curvature of the display layer 102.

Figure 9:
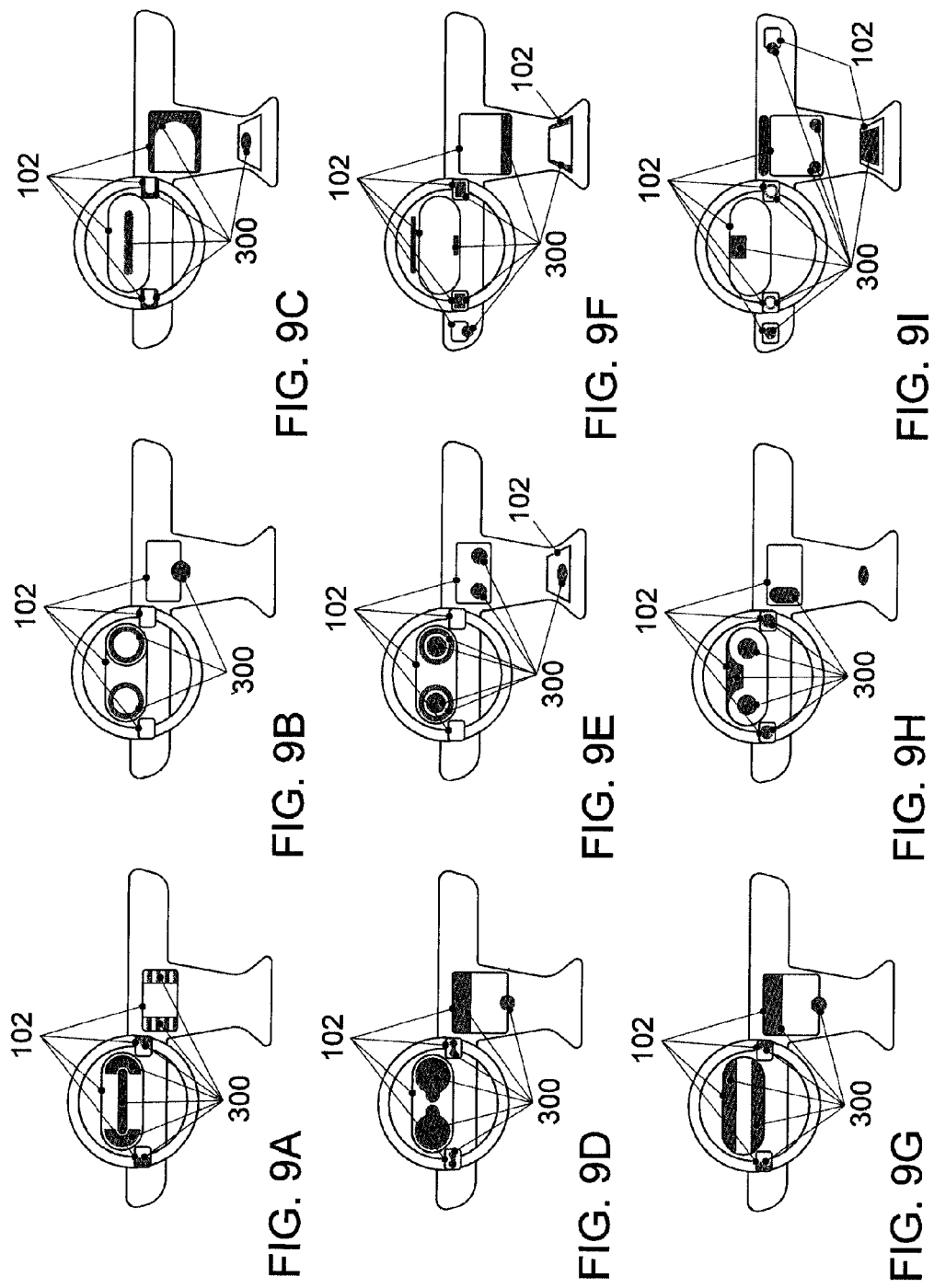
FIG. 9 schematically illustrates arrangements of display devices in an interior of a vehicle.

Although the display device 100 of the exemplary embodiments above may be utilized in connection with a climate control unit, the climate control unit is only one example for using the display device 100. There are many opportunities in the design of vehicle cockpits that could incorporate the display device 100. FIG. 9 shows several possible example embodiments for a usage of the display device 100. The display device can take on various form factors depending on the design needs of the application. For example, FIGS. 9A to 9I show applications to the instrument cluster, steering wheel controls, center console controls, passenger infotainment unit, driver assistance control panel and manual input controls. In each of the example embodiments an outline of the display layer of the display device is referenced by reference numeral 102 and an arrangement of a light guide is indicated with reference numeral 300. As can be seen from FIG. 9, the shape of the light guide 300 is highly variable and not limited to the cylindrical shapes described in connection with FIGS. 1 to 8.

Figure 10:
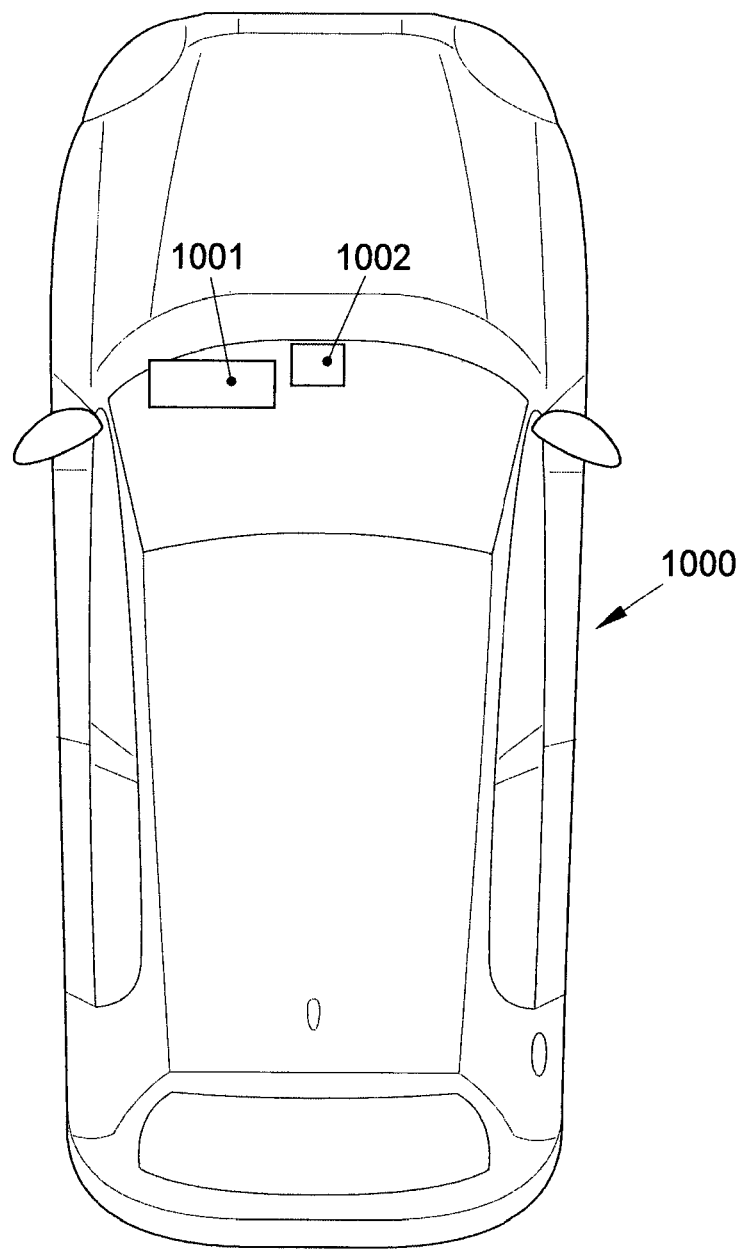
FIG. 10 illustrates a vehicle with display devices according to an example embodiment of the present invention.

The display unit as discussed above may be used in vehicles, for example, cars. For example, as shown in FIG. 10, a vehicle 1000 may include a display device 1001 provided as an instrument panel for a driver and a display device 1002 provided as a center console control. The display devices 1001 and 1002 may be designed as discussed above with respect to any of the example embodiments described with reference to FIGS. 1 to 9. It should be noted that display devices as discussed herein may not only be used in cars, but also in other vehicles, such as motorcycles, ships or planes where instrument panels are needed to provide information to a driver of the vehicle.

While exemplary embodiments have been described above, various modifications may be implemented in other example embodiments. For example, the display devices may be used in other locations of the vehicle, for example, arranged at a backside of a front seat for rear seat passengers. Furthermore, the display layer may have any relief structure as desired and the light guides any other shapes as necessary. Furthermore, the control knobs may include also pushbuttons or sliders.

As already emphasized, the above described example embodiments serve only as illustrative examples, and the scope hereof is not limited to these example embodiments.

What is claimed is:
1. A display device for a vehicle, comprising:
a display unit to emit a luminous depiction of variable image information including at least one of a text and a symbol, wherein the display unit includes a projection display unit;
a display layer, including a back surface and a front surface, to receive the luminous variable image information depiction at the back surface and to display the luminous variable image information depiction on the front surface, wherein the display layer includes a touch-sensitive surface adapted to generate electrical signals indicating a position where a user touches the front surface, and wherein the projection display unit is adapted to project the luminous variable image information depiction on the back surface of the display layer;
a light guide, comprising a fiber optic light pipe having a first surface and a second surface, to guide light received at the first surface to the second surface, with the first surface mounted on the front surface of the display layer to receive at least a part of the luminous variable image information depiction, wherein the light guide is fitted through a cavity that extends through the back surface of the display layer such that the light guide is illuminated by the projection display unit; and
a control knob mounted on the front surface of the display layer, the light guide arranged in the control knob, the second surface of the light guide being exposed at a surface of the control knob.

2. The display device according to claim 1, wherein the projection display unit includes a liquid crystal display or a laser projection display.

3. The display device according to claim 1, wherein the light guide has a cylindrical shape, the first and second surfaces arranged as end faces of the cylindrical shape.

4. The display device according to claim 1, wherein the vehicle comprises one of a car, a motorcycle, a ship, and a plane.

5. The display device according to claim 1, wherein the control knob includes a rotary encoder control knob to generate a signal in response to a rotation of the control knob.

6. The display device according to claim 1, further comprising an optical lens arranged between the display unit and the back surface of the display layer.

7. The display device according to claim 6, wherein the optical lens includes a Fresnel lens.

8. The display device according to claim 1, wherein the display layer includes a diffusion layer.

9. The display device according to claim 1, further comprising an anti glare cover provided on the front surface of the display layer.

10. The display device according to claim 1, further comprising a bezel provided on the front surface of the display layer.

11. The display device according to claim 1, wherein the front surface of the display layer is curved.

12. The display device according to claim 1, wherein the display layer is curved.

13. The display device according to claim 1, wherein the display device is arranged as a component of at least one of a climate control unit, an instrument cluster, a steering wheel control, a center console control, a passenger infotainment unit, and a driver assist control panel of the vehicle.

14. The display device according to claim 1, wherein the luminous variable image information depiction is directed exclusively toward one of a passenger and a driver, using one of a slanted second surface and a curved display layer.

15. The display device according to claim 1, wherein the display device is positioned at a back side of a front seat for rear seat passengers.

16. The display device according to claim 1, wherein the display device provides a three-dimensional impression of the variable image information as an output to a user.

17. A method of displaying variable image information in a vehicle, comprising:
emitting light depicting variable image information including at least one of a text and a symbol with a projection display unit, wherein the projection display unit projects the emitted light on a back surface of a display layer;
transferring the emitted light from the back surface of the display layer to a front surface of the display layer, wherein the display layer includes a touch-sensitive surface adapted to generate electrical signals indicating a position where a user touches the front surface; and
guiding the transferred light, using a fiber optic light pipe having a first surface mounted on the front surface of the display layer, to a second surface of the fiber optic light pipe, wherein a control knob is mounted on the front surface of the display layer, the fiber optic light pipe is arranged in the control knob, and the second surface of the fiber optic light pipe is exposed at a surface of the control knob, and wherein the fiber optic light pipe is fitted through a cavity that extends through the back surface of the display layer such that fiber optic light pipe is illuminated by the projection display unit.

18. The display device according to claim 8, wherein the cavity extends through the diffusion layer, and wherein the first surface is flush with the diffusion layer.

19. The method according to claim 17, wherein the display layer includes a diffusion layer, wherein the cavity extends through the diffusion layer, and wherein the first surface is flush with the diffusion layer.

\* \* \* \* \*